(12) United States Patent
Cooper et al.

(10) Patent No.: US 10,158,610 B2
(45) Date of Patent: Dec. 18, 2018

(54) SECURE APPLICATION COMMUNICATION SYSTEM

(71) Applicant: ADP, LLC, Roseland, NJ (US)

(72) Inventors: Thomas A. Cooper, Sutton, MA (US); Mitchel Jon Maio, Moorpark, CA (US); Vincent Jay LaRosa, Celebration, FL (US)

(73) Assignee: ADP, LLC, Roseland, NJ (US)

( * ) Notice: Subject to any disclaimer, the term of this patent is extended or adjusted under 35 U.S.C. 154(b) by 229 days.

(21) Appl. No.: 15/203,425

(22) Filed: Jul. 6, 2016

(65) Prior Publication Data

US 2018/0013729 A1 Jan. 11, 2018

(51) Int. Cl.
*G06F 21/00* (2013.01)
*H04L 29/06* (2006.01)

(52) U.S. Cl.
CPC ...... *H04L 63/0428* (2013.01); *H04L 63/0281* (2013.01); *H04L 63/08* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 9,729,579 | B1 * | 8/2017 | Marino | H04L 63/20 |
| 9,973,538 | B2 * | 5/2018 | Duan | H04L 63/1408 |
| 2003/0200321 | A1 | 10/2003 | Chen et al. | |
| 2012/0210002 | A1 | 8/2012 | McQuade | |
| 2013/0091557 | A1 * | 4/2013 | Gurrapu | H04W 4/60 726/5 |
| 2013/0227279 | A1 * | 8/2013 | Quinlan | H04L 63/0428 713/165 |
| 2013/0227287 | A1 * | 8/2013 | Quinlan | H04L 67/025 713/168 |
| 2014/0108793 | A1 * | 4/2014 | Barton | G06F 21/6218 713/165 |
| 2014/0143401 | A1 | 5/2014 | Carlen et al. | |
| 2015/0127834 | A1 | 5/2015 | Udupi et al. | |
| 2015/0150025 | A1 * | 5/2015 | Yuen | G06F 9/54 719/312 |
| 2015/0317490 | A1 | 11/2015 | Carey et al. | |
| 2016/0043892 | A1 | 2/2016 | Hason et al. | |
| 2016/0099916 | A1 | 4/2016 | Glazemakers et al. | |
| 2017/0093923 | A1 * | 3/2017 | Duan | H04L 63/1408 |
| 2017/0185507 | A1 * | 6/2017 | Eberlein | G06F 8/60 |

(Continued)

OTHER PUBLICATIONS

Wilder, "Automated Nginx Reverse Proxy for Docker," Jason Wilder's Blog, Mar. 2014, 12 pages, accessed Jun. 30, 2016. http://jasonwilder.com/blog/2014/03/25/automated-nginx-reverse-proxy-for-docker/.

(Continued)

*Primary Examiner* — Eric Chen
(74) *Attorney, Agent, or Firm* — Yee & Associates, P.C.

(57) ABSTRACT

A method and apparatus for sending messages. A message is received by a proxy in a container running on a computer system from an application in the container. A recipient for the message is identified by the proxy using access information. The message is encrypted by the proxy using the access information. The message to the recipient is sent by the proxy, wherein the access information is received from a controller.

39 Claims, 8 Drawing Sheets

(56) References Cited

U.S. PATENT DOCUMENTS

2017/0206071 A1\* 7/2017 Kirkpatrick ............... G06F 8/61
2017/0315795 A1\* 11/2017 Keller ....................... G06F 8/63

OTHER PUBLICATIONS

GITHUB.com, "jwilder/dockerize: Utility to simplify running applications in docker containers," copyright 2016, 3 pages, accessed Jun. 30, 2016. https://github.com/jwilder/dockerize.
JOYENT.com, "Use ContainerPilot with your favorite scheduler," 6 pages, accessed Jun. 30, 2016. https://www.joyent.com/containerpilot.
DOCKER.com, "Linking containers together," 7 pages, accessed Jun. 30, 2016. https://docs.docker.com/v1.8/userguide/dockerlinks/.
"Marathon: A container orchestration platform for Mesas and DCOS," copyright 2016, 3 pages, accessed Jun. 30, 2016. https://mesosphere.github.io/marathon/.

\* cited by examiner

SECURE APPLICATION COMMUNICATION SYSTEM

BACKGROUND INFORMATION

1. Field

The present disclosure relates generally to an improved data processing system and, in particular, to a method and apparatus for sending messages between applications on different data processing systems. Still more particularly, the present disclosure relates to a method and apparatus for secure communications between the applications running on data processing systems that send the messages across a network.

2. Background

The Internet is a global system of interconnected computer networks in which communications are facilitated using the Internet protocol suite transmission control protocol (TCP)/Internet protocol (IP). The communications are carried over an extensive network that employs electronic, wireless, and optical networking technologies. The Internet provides for access to extensive resources and services. These resources and services include interlinked hypertext documents and applications on the World Wide Web. Further, the Internet also is used for electronic mail, voice communications, and file sharing over peer-to-peer networks.

The Internet is commonly used by organizations to perform day-to-day activities. These day-to-day activities include accessing information within an organization. This information may be used to perform operations such as payroll, sales, research, and other suitable operations for the organization. Access to the information occurs over the Internet using data centers, Web servers, cloud computing systems, databases, and other sources for accessing and storing information. Applications may exchange information in which the applications may be located in different parts of the organization. For example, a first application on a server computer may access a second application in a data center.

Network security is employed to ensure that users accessing the information are authorized to access the information. Further, the network security also is employed to prevent interception or access of the information being transmitted between different data processing systems in the organization.

For example, firewalls may be employed to control incoming and outgoing network traffic to a local area network, a computer, a data center, or some other device or system. The firewalls, however, do not identify unauthorized users who may have stolen credentials or spoof secure connections to resemble those from authorized users.

Therefore, it would be desirable to have a method and apparatus that take into account at least some of the issues discussed above, as well as other possible issues. For example, it would be desirable to have a method and apparatus that overcome a technical problem with secure communications between applications.

SUMMARY

An embodiment of the present disclosure provides an application in a container in a data processing system that sends a message and a proxy in the container that receives the message. The proxy identifies a recipient for the message using access information received from a controller outside of the container. The proxy encrypts the message using the access information. The proxy sends the message to the recipient using the access information.

Another embodiment of the present disclosure provides a secure service communications system. The secure service communications system comprises a first container, a first service in the first container, and a first proxy in the first container. The first service sends a message. The proxy intercepts the message sent by the first service. The proxy determines whether the first service is authorized to send the message using access information received from a controller. The proxy identifies a second service for the message when the first service is authorized to send the message in which the second service is identified using the access information and in which the second service and a second proxy for the second service are located in a second container. The proxy encrypts the message using the access information from the controller. The proxy sends the message to the second service using the access information such that the second proxy decrypts the message and sends the message to the second service. Secure communications between the first container and the second container are enabled using the access information.

Yet another embodiment of the present disclosure provides a method for sending messages. A message is received by a proxy in a container running on a computer system from an application in the container. A recipient for the message is identified by the proxy using access information. The message is encrypted by the proxy using the access information. The message is sent to the recipient by the proxy, wherein the access information is received from a controller.

Still another embodiment of the present disclosure provides a computer program product for securing communications in a computer system. The computer program product comprises a computer readable storage media, first program code, second program code, third program code, and fourth program code. The first program code, second program code, third program code, and fourth program code are stored on the computer readable storage media. The first program code receives, by a proxy in a container running on a computer system, a message from an application in the container. The second program code identifies by the proxy, a recipient for the message using access information. The third program code encrypts, by the proxy, the message using the access information. The fourth program code sends, by the proxy, the message to the recipient, wherein the access information is received from a controller.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that when firewalls are used, traffic between applications within a network having the firewalls is typically not encrypted. For example, the illustrative embodiments recognize and take into account that requests such as those made by application programming interfaces (APIs) are typically unsecured within the network. These and other types of calls rely on the firewall and network isolation to provide security for unencrypted network traffic within the network.

The illustrative embodiments recognize and take into account, however, that malware may exist within firewall networks. This malware may be able to view or corrupt data exchanged between the applications.

The illustrative embodiments recognize and take into account that many legacy systems do not have protection for making calls to access data. Also, the illustrative embodiments recognize and take into account that modifying or rewriting these applications to include protection for making the calls may be more expensive and difficult than desired.

The illustrative embodiments also recognize and take into account that current solutions may increase security within the firewalls of the network. The illustrative embodiments recognize and take into account that these solutions, however, may require more time and resources than desired. For example, a proxy may be added into the network to provide point-to-point communications that are secure between two applications. The illustrative embodiments recognize and take into account the use of a proxy as an additional "hop" which increases latency, a point of failure, a bottleneck, or some combination thereof.

Thus, the illustrative embodiments provide a method and apparatus for providing secure communications between applications in a computer system. In one illustrative example, a secure computer system provides the secure communications between the applications. In another illustrative example, the computer system comprises an application and a proxy in a container located in a data processing system within the computer system. The application sends a message. The proxy receives the message; identifies a recipient for the message using access information received from a controller outside of the container; encrypts the message using the access information; and sends the message to the recipient using the access information.

Figure 1:
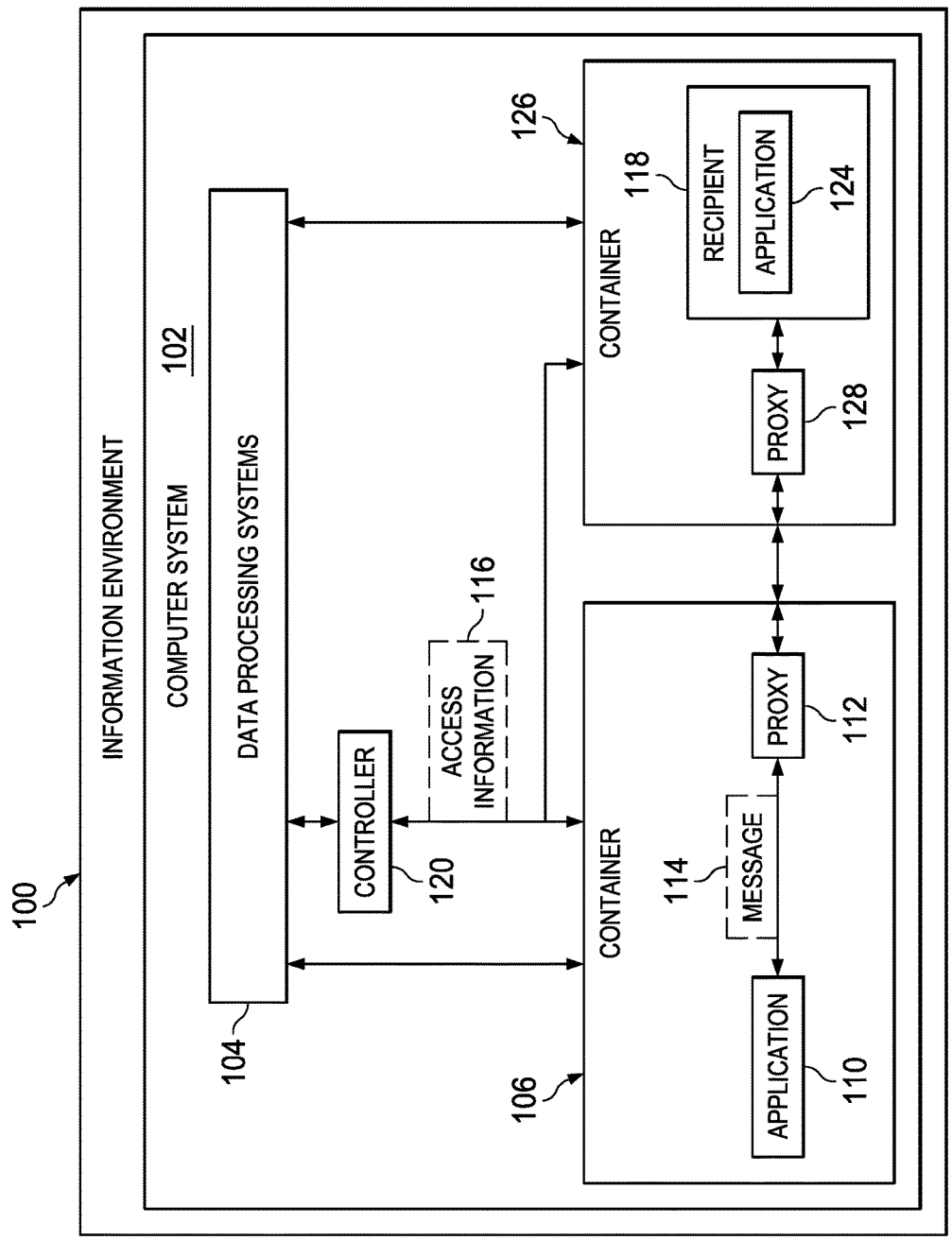
FIG. 1 is an illustration of a block diagram of an information environment in accordance with an illustrative embodiment.

With reference now to the figures and, in particular, with reference to FIG. 1, an illustration of a block diagram of an information environment is depicted in accordance with an illustrative embodiment. In this illustrative example, information environment 100 includes computer system 102. Computer system 102 is a physical hardware system and includes one or more of data processing systems 104. When more than one data processing system is present, those data processing systems are in communication with each other using a communications medium. The communications medium may be a network. Data processing systems 104 may be selected from at least one of a computer, a server computer, a workstation, a tablet, a mobile phone, or some other suitable type of data processing system.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, container 106 is located in one of data processing systems 104 in computer system 102. Container 106 is a software container that contains application 110 and proxy 112. As depicted, container 106 isolates application 110 and proxy 112 from other software components in computer system 102. In this depicted example, all communications going into or out of container 106 go through proxy 112.

In the illustrative example, container 106 may include other components such as a complete file system that is needed to run application 110 and proxy 112. For example, container 106 may include system tools, system libraries, or other components that may be installed on a server. In this manner, container 106 may run the same regardless of what environment in which container 106 is located.

In the illustrative example, application 110 in container 106 sends a communication in the form of message 114. Message 114 is selected from one of a call, an application programming interface (API) call, a request, a reply, or some other message. Message 114 also may include data or other information.

Proxy 112 in container 106 receives message 114. Proxy 112 intercepts message 114 in this example. With this type of implementation, application 110 does not need to be modified to direct message 114 to proxy 112.

In the illustrative example, proxy 112 determines whether application 110 is authorized to send message 114 using access information 116. For example, access information 116 includes at least one of an address, an internet protocol address, a universal resource locator, a recipient for the message, routing information, authorization information, an encryption key, authentication information, or other suitable information.

Access information 116 also may identify a group of message types that application 110 is authorized to send and a group of recipients for messages that are within the group of message types. As used herein, "a group of", when used with reference to items, means one or more items. For example, "a group of message types" is one or more message types.

This determination is an optional step that may be performed to ensure that application 110 is one that actually should be sending messages within container 106. If application 110 is not authorized to send message 114, processing of message 114 ends. The determination of whether application 110 should be sending messages also may be performed by authenticating application 110.

If application 110 is authorized to send message 114, proxy 112 identifies recipient 118 for message 114 using access information 116. As depicted, access information 116 is received from controller 120 located outside of container 106. Controller 120 also runs on one of data processing systems 104. Recipient 118 may or may not be located within another container.

In the illustrative example, recipient 118 may be another application running on another one of data processing systems 104 that is authorized to receive message 114. Also, application 110 may have multiple instances in which each instance is a potential destination for message 114. In other words, application 110 may be an instance of multiple applications that sends messages.

In this illustrative example, proxy 112 encrypts message 114 using access information 116. Proxy 112 sends message 114 to recipient 118 in the encrypted form using access information 116.

In this illustrative example, recipient 118 of message 114 is application 124 located in container 126. Container 126 may be in the same or different data processing system from container 106. In an example of when two applications in a container exchange messages, encryption is optional. Other steps, such as authorizing and routing, are performed and not optional in this example.

Message 114 is received by proxy 128 in container 126. Proxy 128 optionally determines whether application 124 is authorized to receive message 114 from application 110. If application 124 is authorized to receive message 114, proxy 128 decrypts message 114.

In this example, decryption is performed using access information 116 received from controller 120. Controller 120 runs on one of data processing systems 104 and may be on the same or different data processing system from container 106. In another example, the decryption may be performed using a preconfigured cryptography system.

As depicted in this illustrative example, access information 116 provides the information needed to decrypt message 114. For example, access information 116 may identify the decryption process needed to decrypt message 114, a key, or other information that allows proxy 128 to decrypt message 114.

After message 114 has been decrypted, the process sends message 114 in the decrypted form to application 124. In the illustrative example, when a response is returned, the response is encrypted by proxy 128 and sent back to proxy 112. Proxy 112 decrypts the response and returns the unencrypted response to application 110. Depending on how the response is handled, authorization and routing may be unnecessary when a connection between proxy 128 and proxy 112 is still present. In this manner, secure communications may occur between containers, such as container 106 and container 126, in computer system 102.

In the illustrative example, proxy 112, proxy 128, and controller 120 are components that may be implemented in software, hardware, firmware, or a combination thereof. When software is used, the operations performed by these components may be implemented in program code configured to run on hardware such as a processor unit. When firmware is used, the operations performed by proxy 112, proxy 128, and controller 120 may be implemented in program code and data and stored in persistent memory to run on a processor unit. When hardware is employed, the hardware may include circuits that operate to perform the operations in these components.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more technical solutions are present that overcome a technical problem with securing communications between applications. As a result, one or more technical solutions may provide a technical effect providing secure communications between the applications located with proxies in containers in which the proxies use access information to securely transmit messages in communications between the applications.

As a result, computer system 102 operates as a special purpose computer system in which components, such as controller 120 and proxy 112 in container 106 in computer system 102, enables secure communications between the applications. In particular, the components transform computer system 102 into a special purpose computer system as compared to currently available general computer systems that do not have components such as controller 120 and proxy 112 in container 106.

Figure 2:
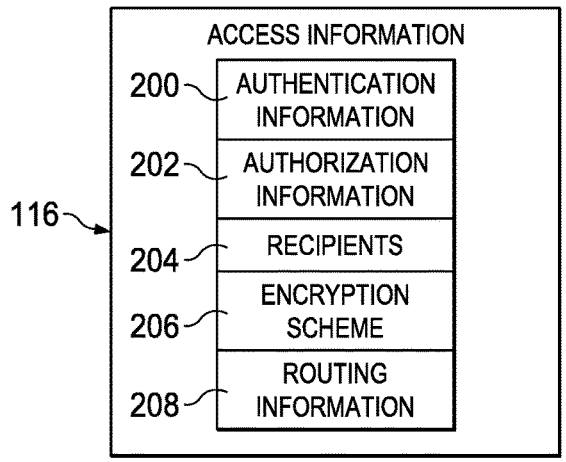
FIG. 2 is an illustration of a block diagram of access information in accordance with an illustrative embodiment.

With reference next to FIG. 2, an illustration of a block diagram of access information is depicted in accordance with an illustrative embodiment. In the illustrative examples, the same reference numeral may be used in more than one figure. This reuse of a reference numeral in different figures represents the same element in the different figures.

Access information 116 includes information used for at least one of determining whether application 110 is authorized to send message 114 in FIG. 1; identify recipient 118 in FIG. 1; identify how message 114 should be encrypted; send message 114 to recipient 118; or other suitable steps used to process message 114. In this illustrative example, access information 116 includes authentication information 200, authorization information 202, recipients 204, encryption scheme 206, and routing information 208.

As depicted, authentication information 200 includes information used to authenticate an application sending a message. Authorization information 202 is used to identify what messages may be sent by the application. For example, in FIG. 1, controller 120 may provide a mechanism for proxy 112 to identify the messages sent by application 110 and what messages may be sent by application 110.

As depicted in this illustrative example, authorization information 202 identifies message types that may be sent by application 110 in FIG. 1. For example, authorization information 202 may identify message types such as the types of API calls that may be made, such as an API call that requests restricted information. An API call may be compared to a table of registered APIs that application 110 is allowed to call.

In this illustrative example, recipients 204 are other applications that may receive message 114 from application 110 in FIG. 1. These other applications may be, for example, instances of an application or different types of applications.

Encryption scheme 206 identifies a type of encryption process that is used to encrypt message 114 to send message 114 to a particular recipient in recipients 204. Each recipient may use a different type of encryption scheme from some or all of the other recipients. The encryption scheme may be, for example, a symmetric key encryption, an asymmetric key encryption, a public key encryption, or some other type of encryption scheme. As depicted, encryption scheme 206 also may include any keys, certificates, or other information that may be used in the encryption scheme.

In this example, routing information 208 identifies a route used to reach each one of recipients 204. Routing information 208 may be selected from at least one of an Internet protocol (IP) address, a network address, a port, or some other type of information used to route messages. In these illustrative examples, the routing information may be selected such that the message travels over a path with a single "hop". As used herein, a "hop" is a portion of a path that is between two devices.

Figure 3:
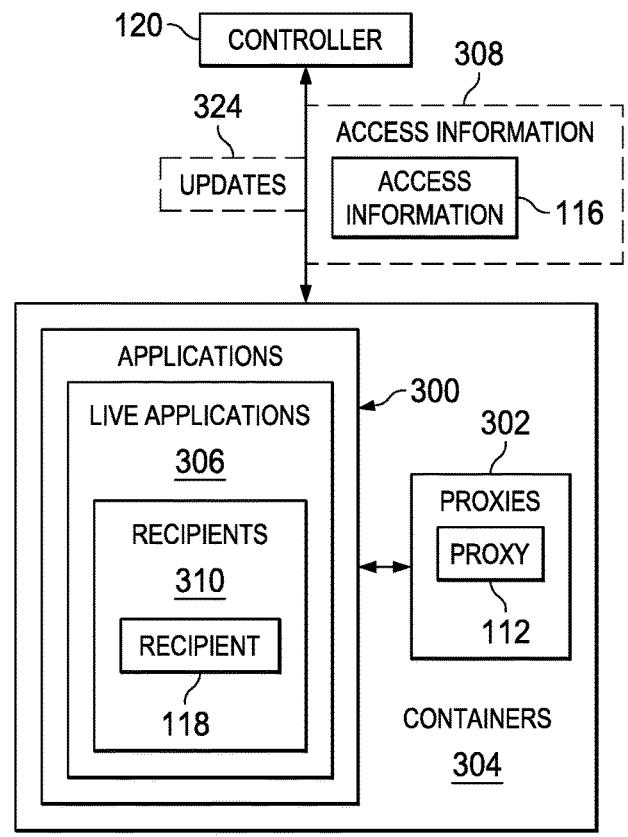
FIG. 3 is an illustration of a block diagram of dataflow used to send access information to proxies in accordance with an illustrative embodiment.

With reference next to FIG. 3, an illustration of a block diagram of dataflow used to send access information to proxies is depicted in accordance with an illustrative embodiment. Controller 120 coordinates communication in the form of an exchange of messages between applications 300 and proxies 302 in containers 304. In this illustrative example, applications 300, proxies 302, and containers 304 are examples of other components that may be present in information environment 100 in addition to or in place of the components illustrated in FIG. 1.

In this example, applications 300 are associated with proxies 302 in containers 304. In other illustrative examples, some of applications 300 may not be located in containers 304 and are not associated with proxies 302.

Controller 120 identifies live applications 306 in applications 300. Live applications 306 may be identified in a number of different ways. For example, live applications 306 may register with controller 120 via proxies 302 for live applications 306 when live applications 306 are initiated. Further, heartbeats may be generated by proxies 302. The heartbeats are signals sent by proxies 302 associated with live applications 306. The heartbeats may be broadcasted or directed towards controller 120. These heartbeats are detected by controller 120 and used to identify live applications 306.

As depicted, for each one of live applications 306, controller 120 identifies one or more of live applications 306 in the group of live applications 306 that may receive messages from a live application. Thus, each live application will have a group of live applications 306 that can receive and process messages from that live application.

Controller 120 generates access information 308 and sends access information 308 to proxies 302 for live applications 306. For example, controller 120 identifies a group of recipients 310 in the group of live applications 306 that is authorized to receive message 114 from application 110 in FIG. 1. In other words, application 110 is authorized to send message 114 to the group of recipients 310 in live applications 306.

Controller 120 generates and sends access information 116 to proxy 112 using the group of recipients 310 that controller 120 has identified in the group of live applications 306. Access information 116 is information in access information 308 that is for proxy 112. Other ones of proxies 302 receive information in access information 308 that is for use by proxies 302. In other words, each one of proxies 302 may receive different information in access information 308.

For example, controller 120 may send an identification of the group of recipients 310 identified, criteria for selecting recipient 118 from the group of recipients 310, and routing information used by proxy 112 to directly send message 114 to recipient 118 in access information 116. The identification of the group of recipients 310 may be selected from at least one of a name, an Internet protocol (IP) address, or some other suitable type of identifier.

As another example, controller 120 identifies encryption information used by the group of recipients 310 and sends the encryption information in access information 116 to proxy 112. In another illustrative example, controller 120 repeats identifying the availability of the group of recipients 310 for messages sent by application 124 in FIG. 1 after having initially sent access information 116 to proxy 112 and sends updates 324 to proxy 112 identifying a current group of recipients 310 for application 110.

Access information 308 may be generated each time an event occurs. The event may be a periodic event or a non-periodic event. For example, controller 120 may generate access information 308 after a period of time has passed such as 30 seconds, one minute, ten minutes, or some other period of time. In another example, a non-periodic event may be a new live application registering with controller 120, a request for access information 308 by proxy 112, or some other type of non-periodic event.

In the illustrative example, updates 324 to access information 308 are sent to proxies 302 for live applications 306. In this manner, changes in the composition of live applications 306 may be taken into account. For example, if a live application in live applications 306 is no longer running, the composition of live applications 306 changes. This change is taken into account in updates 324 to access information 308. If another application begins to run, the application is a new live application that may be included in live applications 306.

In yet another illustrative example, a live application may have been identified as being compromised with respect to security. This live application may be removed from recipients 310. Further, changes in recipients 310 for applications 300 may be changed to perform load-balancing.

In this manner, access information 308 for proxies 302 may be dynamically changed while applications 300 and proxies 302 run and exchange information. Further, the processes needed to be run by proxies 302 to identify recipients 310 may be reduced through performing these processes in controller 120.

At least one of a push mechanism or a pull mechanism may be used to generate and send access information 308. For example, a proxy may initially register with controller 120 to generate and send access information 308 as part of registration. Thereafter, controller 120 may periodically generate updates 324 to access information 308. Updates 324 may then be pushed to proxies 302 for live applications 306.

Figure 4:
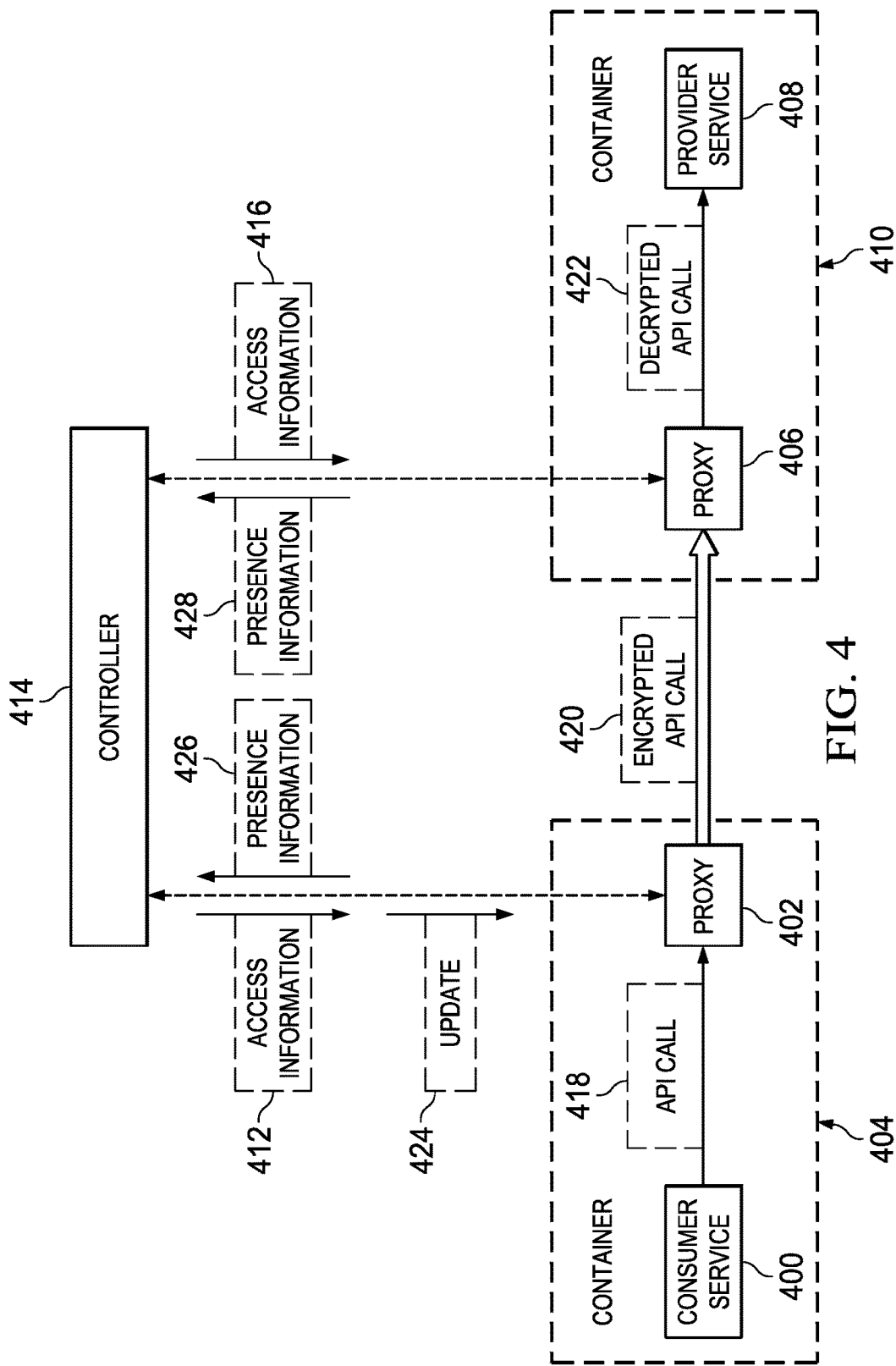
FIG. 4 is an illustration of a block diagram of dataflow for services that occurs when making a call in accordance with an illustrative embodiment.

Turning next to FIG. 4, an illustration of a block diagram of dataflow for services that occurs when making a call is depicted in accordance with an illustrative embodiment. In this illustrative example, consumer service 400 and proxy 402 are located in container 404. Proxy 406 and provider service 408 are located in container 410. Consumer service 400 and provider service 408 are examples of applications 300 in FIG. 3. In this illustrative example, a service is a group of related functionalities that can be reused for different purposes.

At startup, proxy 402 obtains access information 412 from controller 414. Proxy 406 obtains access information 416 from controller 414 at startup. For example, proxy 402 and proxy 406 contact controller 414 and identify themselves to controller 414. As depicted, access information 412 and access information 416 may include keys, authorizations, routes, recipients, and other suitable information.

In this illustrative example, consumer service 400 makes an application programming interface (API) call 418. This API call may be a representational state transfer (REST) call. In this manner, consumer service 400 does not need modifications to make API call 418.

API call 418 may be directed to proxy 402 through a localhost connection within container 404. Proxy 402 may be configured with a consumer service name for consumer service 400 and an identifier from an API registration library in access information 412. This information may be used to authenticate and determine whether consumer service 400 can make API call 418.

As depicted in this example, proxy 402 performs authentication, authorization, and routing to the recipient using access information 412. In this example, API call 418 is encrypted and sent as encrypted API call 420. Further, in the illustrative example, the routing of encrypted API call 420 is performed directly to proxy 406 without needing intermediate "hops".

Encrypted API call 420 is received by proxy 406. Proxy 406 also performs validation, authorization, and decryption of encrypted API call 420 using access information 416. For example, access information 416 for proxy 406 may include at least one of a provider service name for provider service 408, an identification of decrypted API call 422 as being an authorized API call that can be made to provider service 408, or other suitable information.

If encrypted API call 420 is identified as being permitted to be made to provider service 408 by consumer service 400, proxy 406 decrypts encrypted API call 420 to form decrypted API call 422. Decrypted API call 422 is then sent to provider service 408.

In response to processing decrypted API call 422, a response may be sent in the other direction back to consumer service 400 using the same process described for sending API call 418. In another illustrative example, if a synchronous response is used, some of the steps illustrated in FIG. 4 are omitted. For example, lookup to identify an application and authorization are omitted. The process only encrypts the response being returned for encrypted API call 420, decrypted in proxy 402, and returned unencrypted to consumer service 400. An asynchronous response may be used with representational state transfer (REST).

Updates to at least one of access information 412 and access information 416 may be made. For example, proxy 406, provider service 408, or both may be compromised. The compromise may be detected by controller 414. Controller 414 may send update 424 to proxy 402. The update removes provider service 408 from a list of recipients that API calls can be made to by consumer service 400.

In another illustrative example, the number of API calls made to provider service 408 may be at a level that increases response time needed to process the API calls to a level that is higher than desired. In this case, controller 414 may remove provider service 408 from the list of provider services that may be called by consumer service 400. Controller 414 may add other provider services in place of provider service 408.

As depicted in this figure, controller 414 may receive information from proxy 402 and container 404 and proxy 406 in container 410. This information is used to perform operations such as identifying live applications, routing, performance management, and other suitable types of operations.

In this illustrative example, presence information 426 is received from proxy 402. In a similar fashion, presence information 428 is received from proxy 406. Presence information 426 and presence information 428 may include different types of information used to identify the live applications and determine whether previously identified live applications are still running. The presence information may include a registration request, a heartbeat, a log, or other information to indicate a presence of a service such as consumer service 400 or provider service 408.

Figure 5:
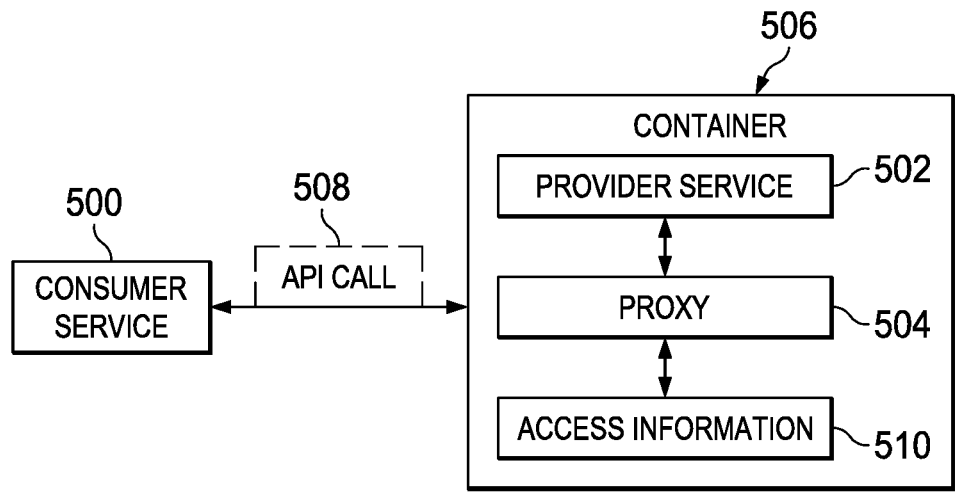
FIG. 5 is an illustration of a block diagram of dataflow for sending messages from a consumer service without a proxy to a provider service with the proxy in accordance with an illustrative embodiment.

Turning to FIG. 5, an illustration of a block diagram of dataflow for sending messages from a consumer service without a proxy to a provider service with the proxy is depicted in accordance with an illustrative embodiment. In this example, consumer service 500 is similar to an application in applications 300 in FIG. 3, except consumer service 500 is not located in a container in this figure.

As depicted, provider service 502 and proxy 504 are located in container 506. Consumer service 500 makes API call 508 which is received by proxy 504.

In this illustrative example, proxy 504 is unable to authenticate consumer service 500. As a result, proxy 504 is unable to verify consumer service 500 to send API call 508 to provider service 502.

In this example, proxy 504 is still able to determine whether consumer service 500 is authorized to send API call 508 using access information 510. Access information 510 is received from a controller, such as controller 120 in FIG. 1. Proxy 504 is configured to identify, authorize, and route API call 508, as well as responses to API call 508.

This situation may exist in a hybrid environment during a migration of applications to containers with proxies. This type of processing of API calls also may occur if legacy applications cannot be moved into the containers with the proxies.

Figure 6:
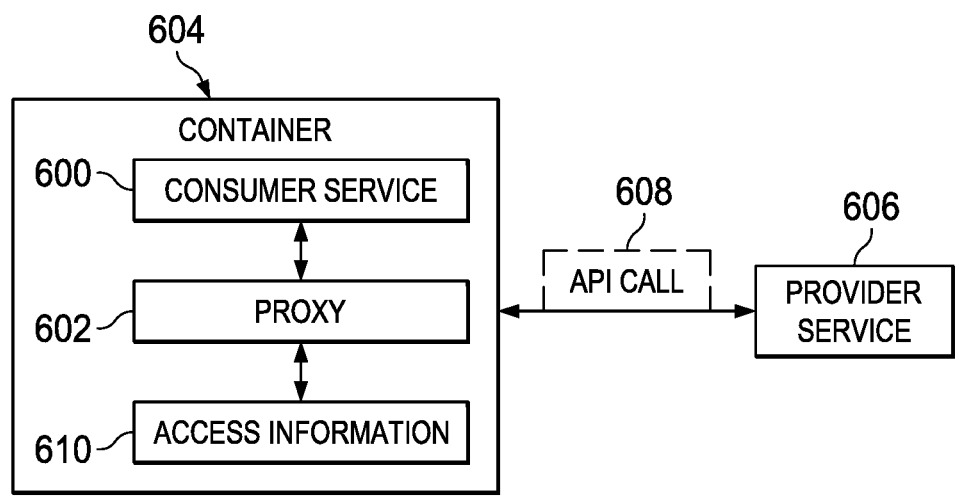
FIG. 6 is an illustration of a block diagram of dataflow for sending messages to a provider service without a proxy and outside of containers in accordance with an illustrative embodiment.

Turning next to FIG. 6, an illustration of a block diagram of dataflow for sending messages to a provider service without a proxy and outside of containers is depicted in accordance with an illustrative embodiment. In this illustrative example, consumer service 600 and proxy 602 are located inside of container 604. Provider service 606 is not located in a container and does not have a proxy. Consumer service 600 and provider service 606 are examples of implementations for applications 300 in FIG. 3.

As depicted, consumer service 600 makes API call 608. Proxy 602 uses access information 610 received from a controller to determine whether API call 608 can be sent to provider service 606. Proxy 602 does not send API call 608 to provider service 606 unless access information 610 indicates that provider service 606 may be used.

Proxy 602 identifies provider service 606 as a recipient, determines whether consumer service 600 is authorized to make API call 608, and routes API call 608 to provider service 606 using access information 610. In this case, API call 608 is sent to provider service 606 without encryption as indicated in access information 610.

The illustrations of information environment 100 and the different components in information environment 100 in FIGS. 1-6 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more controllers in addition to controller 120 in FIG. 1 and FIG. 3 may be present for generating and managing access information 308 for proxies 302 in FIG. 3. In another example, the illustration of access information 116 in FIGS. 1-3 may omit authentication information in some illustrative examples. As another example, other types of information may be included to control the manner in which messages are handled for application 110 in FIG. 1.

In yet another example, a proxy may be associated with more than one application. For example, proxy 112 in FIG. 1 may handle communications for one or more applications inside of container 106 in FIG. 1 in addition to application 110.

Figure 7:
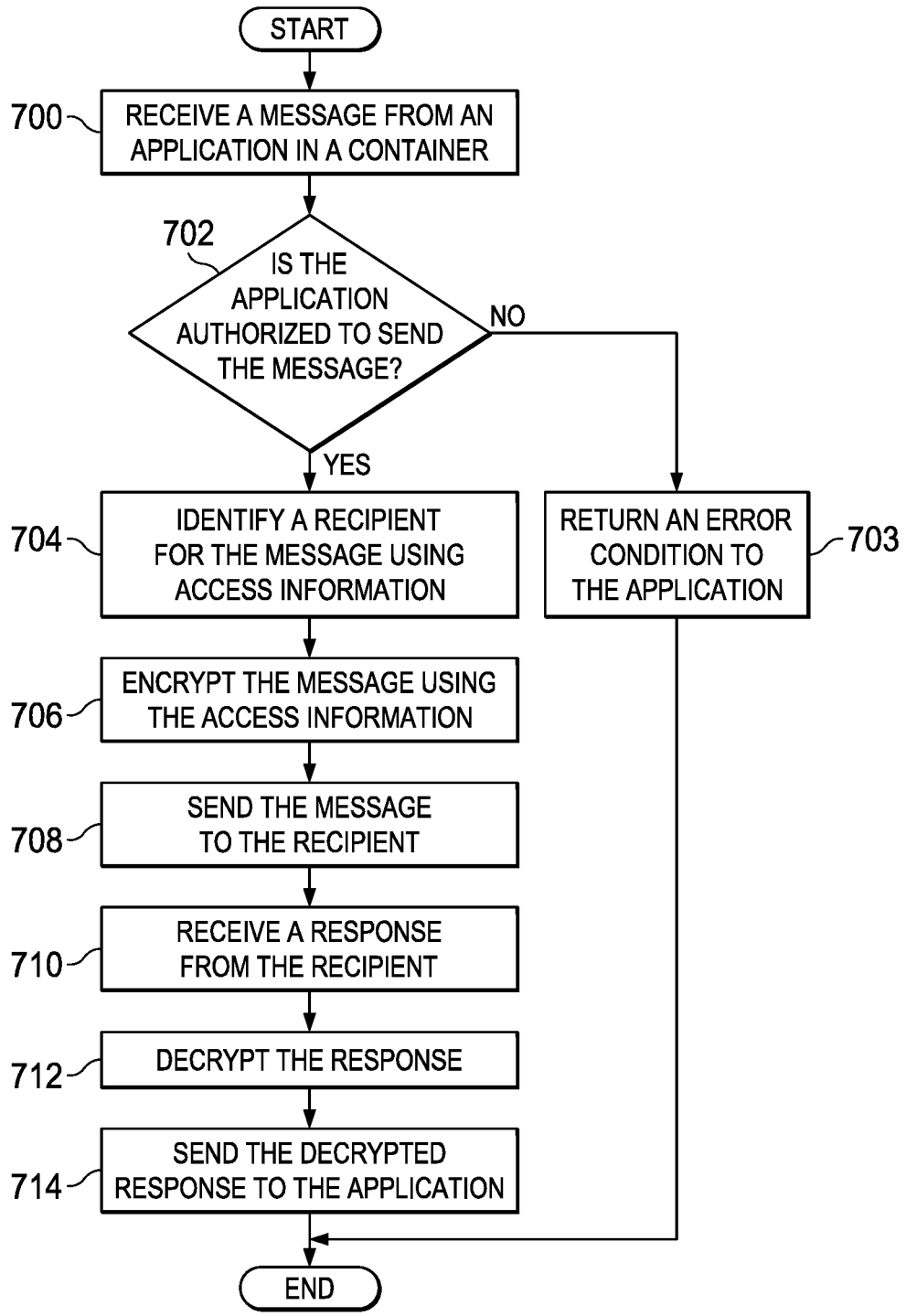
FIG. 7 is an illustration of a flowchart of a process for sending messages in accordance with an illustrative embodiment.

Turning next to FIG. 7, an illustration of a flowchart of a process for sending messages is depicted in accordance with an illustrative embodiment. The process illustrated in FIG. 7 may be implemented in a proxy, such as proxy 112 in FIG. 1, to send messages in a secure manner.

The process begins by receiving a message from an application in a container (step 700). Next, the process determines whether the application is authorized to send the message (step 702). If the application is not authorized to send the message, an error condition is returned to the application (step 703) with the process terminating thereafter.

Otherwise, the process identifies a recipient for the message using access information (step 704). The process encrypts the message using the access information (step 706). The process then sends the message to the recipient (step 708). The process receives a response from the recipient (step 710). The response is then decrypted (step 712) and the decrypted response is sent to the application (step 714). The process terminates thereafter.

Figure 8:
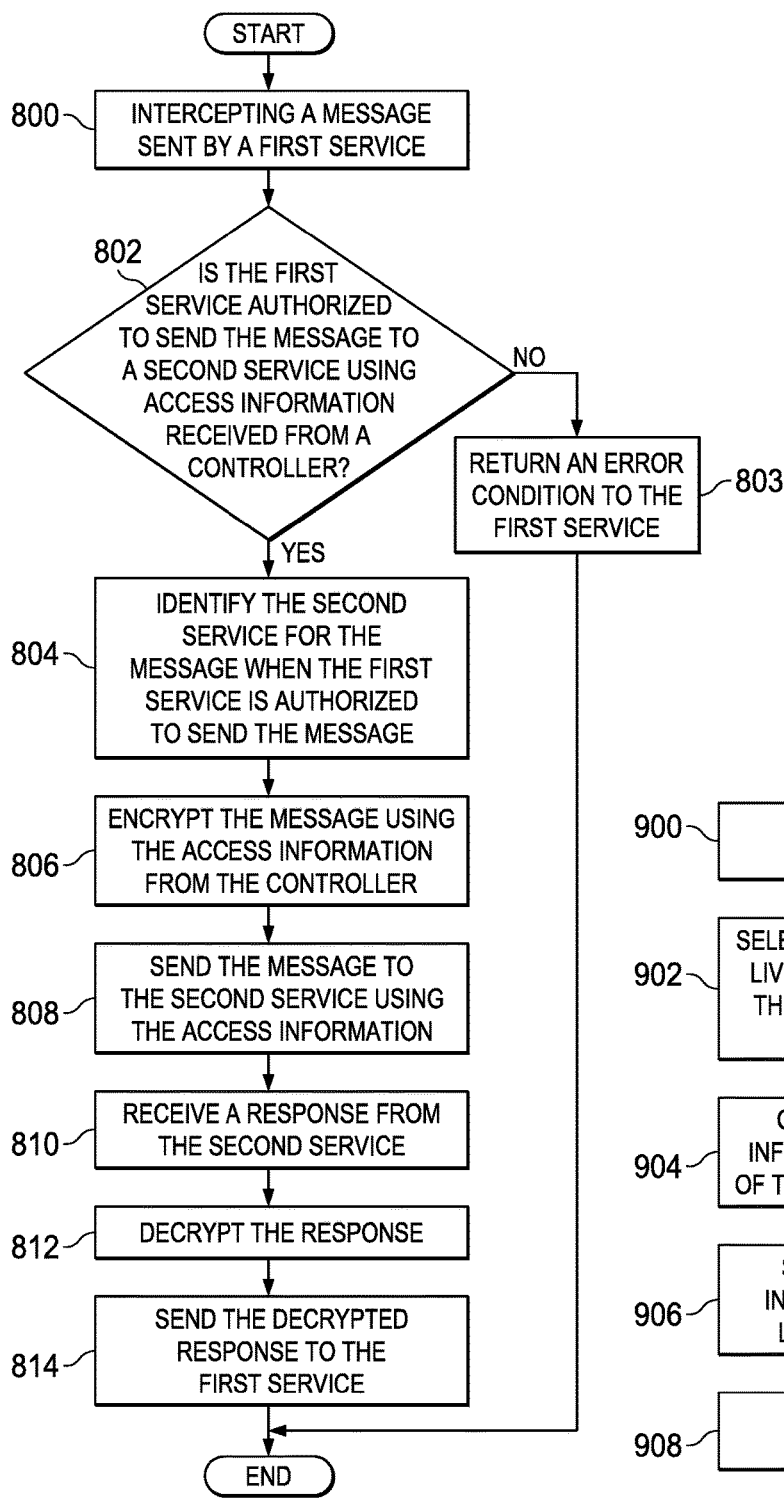
FIG. 8 is an illustration of a flowchart of a process for sending messages between services in accordance with an illustrative embodiment.

With reference now to FIG. 8, an illustration of a flowchart of a process for sending messages between services is depicted in accordance with an illustrative embodiment. The process illustrated in FIG. 8 may be implemented in proxies 302 in FIG. 3 to handle the messages made between applications 300 in FIG. 3 in the form of services.

The process begins by intercepting a message sent by a first service (step 800). The message in step 800 is a call to a second service. The process determines whether the first service is authorized to send the message to a second service using access information received from a controller (step 802). If the first service is not authorized to send the message, an error condition is returned to the first service (step 803) with the process terminating thereafter.

Otherwise, the process identifies the second service for the message when the first service is authorized to send the message (step 804). In step 804, the second service is identified using the access information. The second service and a second proxy for the second service are located in a second container.

The process encrypts the message using the access information from the controller (step 806), and sends the message to the second service using the access information (step 808). In step 808, the message may be directed to the second service with the second proxy intercepting the message. In another illustrative example, the access information is such that the proxy for the second service directs the message to the second proxy. In this manner, the second proxy will decrypt the message and send the message to the second service.

The process receives a response from the second service (step 810). The response is decrypted (step 812) and the decrypted response is sent to the first service (step 814). The process terminates thereafter. As a result, secure communications between the first container and the second container are enabled using the access information.

Figure 9:
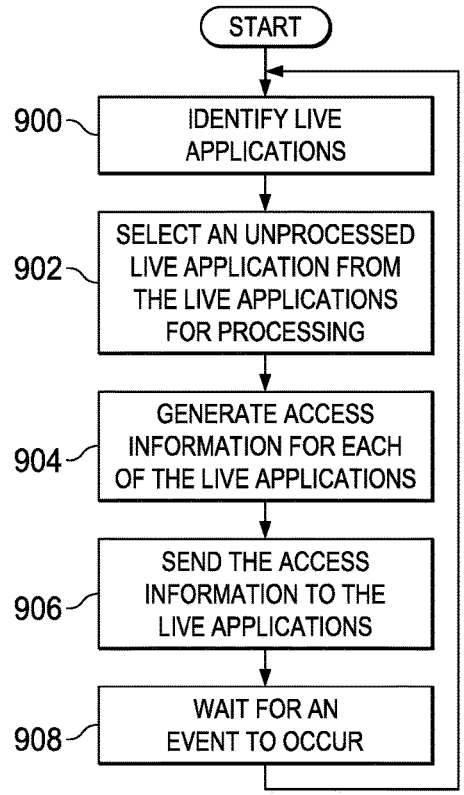
FIG. 9 is an illustration of a flowchart of a process for generating and sending access information in accordance with an illustrative embodiment.

With reference now to FIG. 9, an illustration of a flowchart of a process for generating and sending access information is depicted in accordance with an illustrative embodiment. The process illustrated in FIG. 9 may be implemented in controller 120 shown in block form in FIG. 1.

The process begins by identifying live applications (step 900). The live applications may be comprised of instances of one or more applications.

The identification of the live applications may be made in a number of different ways. The live applications may be identified when the live applications register with a controller through associated proxies. The live applications also may be identified through a broadcast mechanism such as heartbeats generated by the live applications. The proxies in turn may detect the live applications in broadcast heartbeats that are detected by the controller. In this manner, the controller monitors the live applications to determine whether new live applications are added or if the live applications have ceased running. The process then selects an unprocessed live application from the live applications for processing (step 902) and generates access information for each of the live applications (step 904).

Next, the process sends the access information to the live applications (step 906). The process then waits for an event to occur (step 908). The event may be selected from at least one of a registration of a new live application, a failure to detect a heartbeat from one of the live applications, an expiration of a timer, or some other suitable type of event. When the event occurs, the process returns to step 900 as described above.

Figure 10:
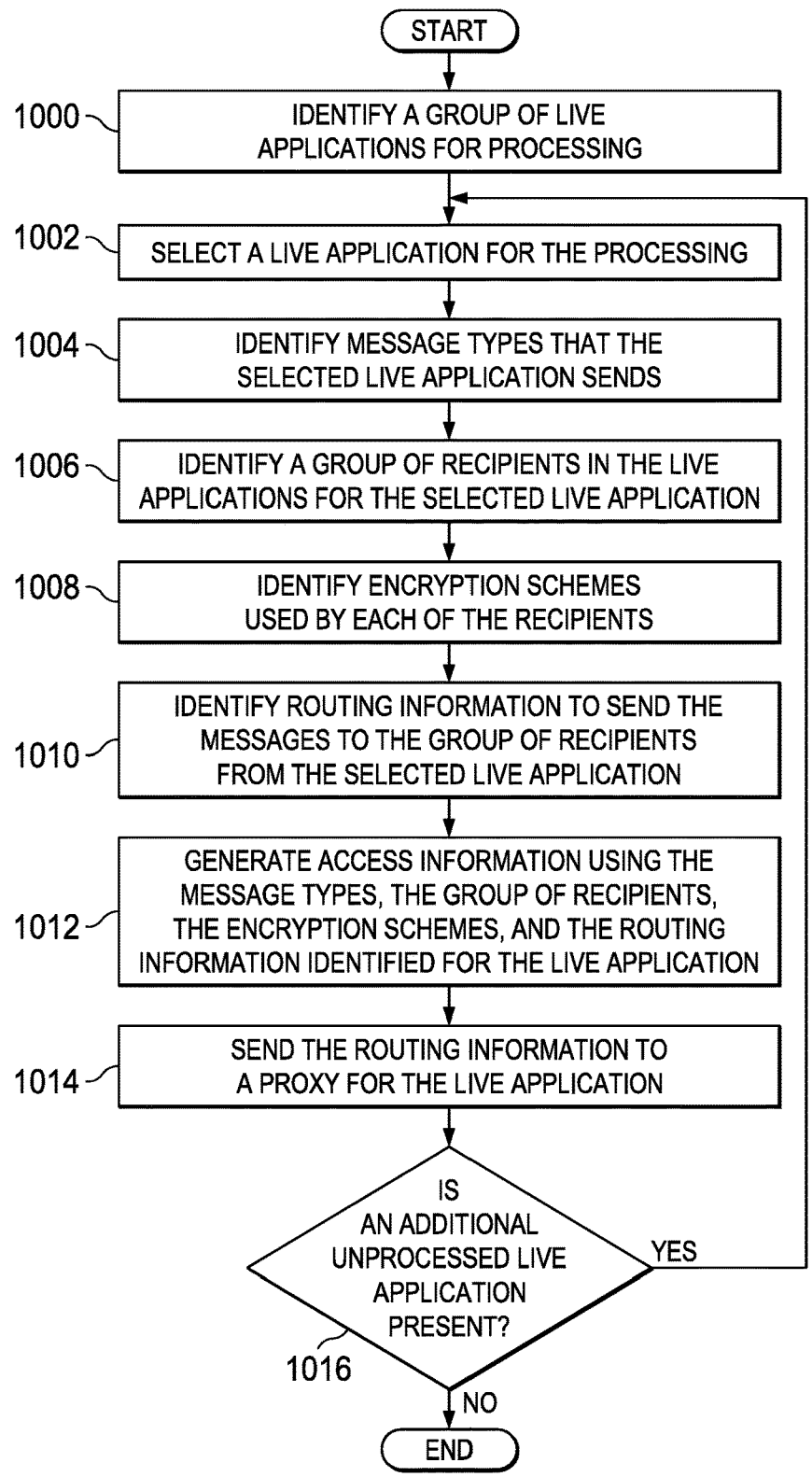
FIG. 10 is an illustration of a flowchart of a process for generating access information in accordance with an illustrative embodiment.

With reference next to FIG. 10, an illustration of a flowchart of a process for generating access information is depicted in accordance with an illustrative embodiment. The process illustrated in FIG. 10 may be implemented in controller 120 in FIG. 1.

The process begins by identifying a group of live applications for processing (step 1000). Next, the process selects a live application for the processing (step 1002). The process then identifies message types that the selected live application sends (step 1004).

The process identifies a group of recipients in the live applications for the selected live application (step 1006). The recipients may be identified in a number of different ways. For example, the recipients may be identified based on the live applications that are able to process the message types that the selected live application will send. For example, the message types may be types of API calls or other requests that the live application may make to access information.

The access of the information includes at least one of retrieving the information, writing the information, or performing other operations with respect to the information. In addition to identifying recipients based on the message types, a controller also may take into account other factors such as routing conditions, latency, whether messages can be sent using a single "hop", or other suitable conditions.

The process identifies encryption schemes used by each of the recipients (step 1008). The process also identifies routing information to send the messages to the group of recipients from the selected live application (step 1010).

The process then generates access information using the message types, the group of recipients, the encryption schemes, and the routing information identified for the live application (step 1012). The process then sends the routing information to a proxy for the live application (step 1014). In this example, a proxy is only sent access information for applications from which the proxy is allowed to receive messages and for applications to which this proxy can send messages. A determination is made as to whether an additional unprocessed live application is present (step 1016).

If an additional unprocessed live application is present, the process returns to step 1002. If an additional unprocessed live application is not present, the process terminates.

In this manner, each proxy is sent access information about only the proxy's neighbors. In other words, a proxy is only given access information for those applications that the application associated with the proxy is allowed to receive calls from, or that the application associated with the proxy calls. When a new application comes online, only proxies for applications that the new application directly interacts with need to be updated. Further, when an application no longer is present or is to be used, proxies for the application directly affected are updated to remove the application. As a result, scalability is enabled.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in the process illustrated in FIG. 10, access information may be sent to different proxies after all live applications have been processed to generate access information. As another example, an additional step may be added to the flowchart in FIG. 10 to identify and create authentication information for inclusion in the access information. For example, the process illustrated in FIG. 7 may also include an authentication step.

Figure 11:
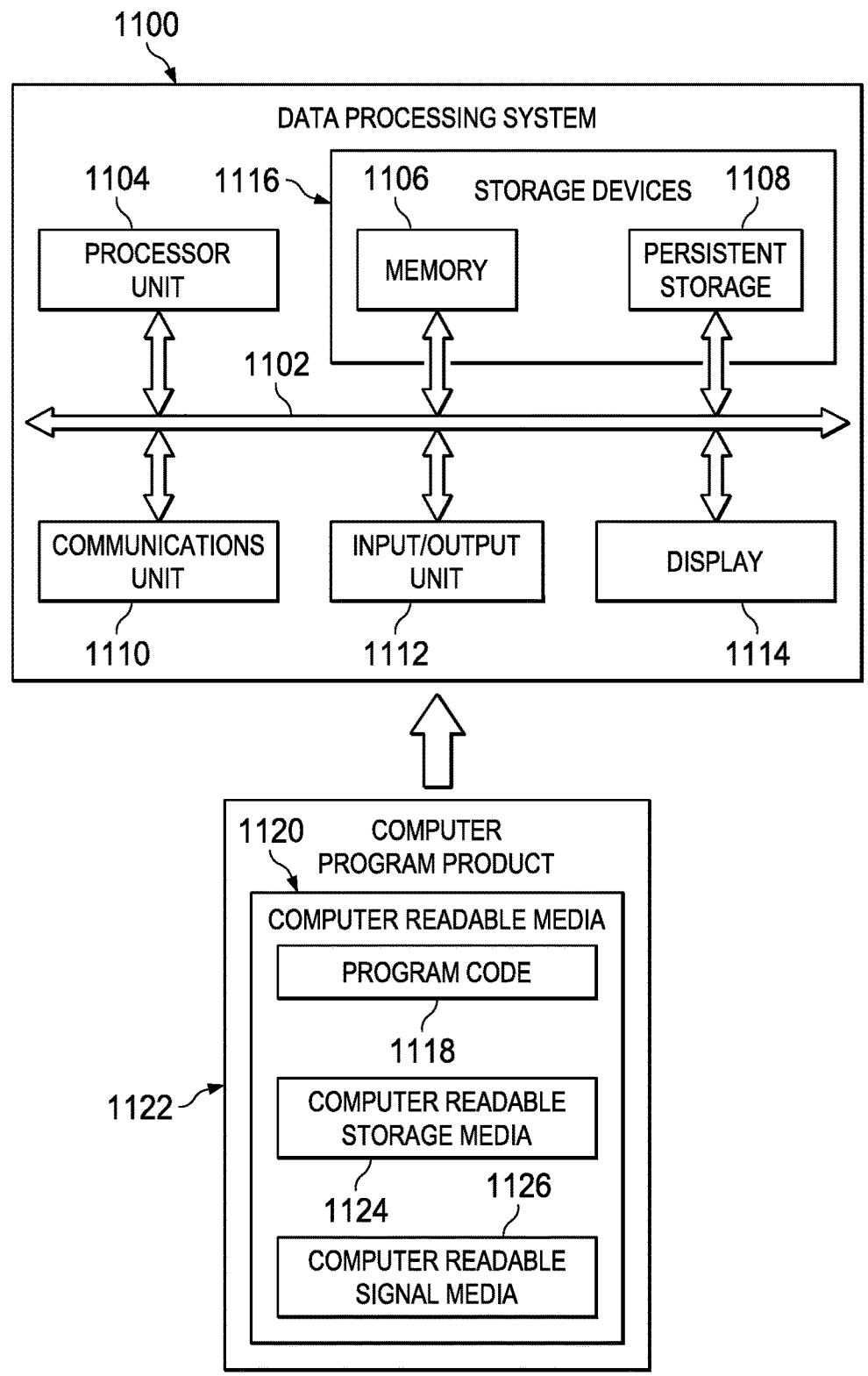
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement one or more of data processing systems 104 in computer system 102 in FIG. 1. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid state hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Thus, one or more technical solutions are present that overcome a technical problem with secure communications between applications. As a result, one or more technical solutions may provide a technical effect of providing secure communications between the applications located with proxies in containers in which the proxies use access information to securely transmit messages in communications between the applications.

Further, one or more technical solutions also include sending a proxy access information needed to handle the messages from the application associated with the proxy. In this manner, the access information sent to the proxy is tailored to the particular application and reduces the amount of information sent to the proxies. Further, as conditions in the computer system change, updates can be made to the access information.

The descriptions of the different illustrative embodiments have been presented for purposes of illustration and description and are not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer system comprising:
   a data processing device;
   an application in a container in the data processing device that sends a message; and
   a proxy in the container, wherein all communications into and out of the container go through the proxy, wherein the proxy:
   receives the message;
   identifies a recipient for the message using access information received from a controller outside of the container, wherein the access information comprises a group of recipients in live applications identified by the controller, encryption schemes used by each of the recipients, and routing information to send messages to the group of recipients;
   encrypts the message using the encryption schemes contained in the access information; and
   sends the message to the recipient using the routing information contained in the access information.

2. The computer system of claim 1, wherein the proxy determines whether the application is authorized to send the message and performs identifying the recipient for the message using the access information; encrypting the message using the access information; and sending the message to the recipient using the access information when the application is authorized to send the message.

3. The computer system of claim 1, wherein the controller provides a mechanism for the proxy to identify messages sent by the application.

4. The computer system of claim 1, wherein the container isolates the application and the proxy from other software components in the computer system.

5. The computer system of claim 1, wherein the access information identifies a group of message types that the application is authorized to send and a group of recipients for messages that are within the group of message types.

6. The computer system of claim 1, wherein the controller identifies a group of recipients that is authorized to receive the message from the application and sends an identification of the group of recipients identified; criteria for selecting the recipient from the group of recipients; and routing information used by the proxy to directly send the message to the recipient.

7. The computer system of claim 6, wherein the controller identifies encryption information used by the group of recipients and sends the encryption information and the access information to the proxy.

8. The computer system of claim 6, wherein the controller identifies an availability of recipients for the messages sent by the application and sends updates to the proxy identifying a current group of recipients for the application.

9. The computer system of claim 1, wherein the access information is selected from at least one of an address, an internet protocol address, a universal resource locator, the recipient for the message, routing information, authorization information, an encryption key, or authentication information.

10. The computer system of claim 1, wherein the proxy receives the access information from the controller while the proxy is running and receives updates to the access information while the proxy is running.

11. The computer system of claim 1, wherein the proxy is configured with an identification of the application that sends the message and only accepts the message from the application using the identification.

12. The computer system of claim 1, wherein the recipient is selected from one of a second proxy, a second application, and a provider service.

13. The computer system of claim 1, wherein the application is a consumer service and the message sent by the consumer service is directed to a provider service.

14. The computer system of claim 1, wherein the message is selected from one of a call, an application programming interface call, a request, and a reply.

15. A secure service communications system comprising:
   a data processing device;
   a first container in the data processing device;
   a first service in the first container, wherein the first service sends a message; and
   a first proxy in the first container, wherein all communications into and out of the container go through the proxy, wherein the proxy:
     intercepts the message sent by the first service;
     determines whether the first service is authorized to send the message using access information received from a controller outside of the first container, wherein the access information comprises a group of recipients in live applications identified b the controller, encryption schemes used by each of the recipients, and routing information to send messages to the group of recipients;
     identifies a second service for the message from among the group of recipients when the first service is authorized to send the message in which the second service is identified using the access information and in which the second service and a second proxy for the second service are located in a second container;
     encrypts the message using the encryption schemes contained in the access information received from the controller; and
     sends the message to the second service using the routing information contained in the access information such that the second proxy decrypts the message and sends the message to the second service, wherein secure communications between the first container and the second container are enabled using the access information.

16. The secure service communications system of claim 15, wherein the first container isolates the first service and the first proxy from other software components in the secure service communications system.

17. The secure service communications system of claim 15, wherein the controller identifies a group of services that is authorized to receive the message from the first service and sends the group of services identified, criteria for selecting the second service from a group of recipients, and routing information used by the first proxy to directly send the message to the second service.

18. The secure service communications system of claim 17, wherein the controller identifies an availability of recipients for messages sent by the first service and sends updates to the first proxy identifying a current group of services for the first service.

19. The secure service communications system of claim 15, wherein the controller identifies encryption information used by a group of services and sends the encryption information used by the group of services and the access information to the first proxy.

20. The secure service communications system of claim 15, wherein the access information is selected from at least one of an address, an internet protocol address, a universal resource locator, a recipient for the message, routing information, authorization information, an encryption key, or authentication information.

21. The secure service communications system of claim 15, wherein the first proxy is configured with an identification of the first service that sends the message and only accepts the message from a first application using the identification.

22. The secure service communications system of claim 15, wherein the message is selected from one of a call, an application programming interface call, and a reply.

23. A method for sending messages, the method comprising:
   receiving, by a proxy in a container running on a computer system, a message from an application in the container, wherein all communications into and out of the container go through the proxy;
   identifying, by the proxy, a recipient for the message using access information received from a controller outside of the container, wherein the access information comprises a group of recipients in live applications identified by the controller, encryption schemes used b each of the recipients, and routing information to send messages to the group of recipients;
   encrypting, by the proxy, the message using the encryption schemes contained in the access information; and
   sending, by the proxy, the message to the recipient using the routing information contained in the access information.

24. The method of claim 23 further comprising:
   determining whether the application is authorized to send the message, wherein performing identifying the recipient for the message using the access information; encrypting the message using the access information; and sending the message to the recipient when the application is authorized to send the message.

25. The method of claim 23, wherein the container isolates the application and the proxy from other software components in the computer system.

26. The method of claim 23, wherein the access information identifies a group of message types that the application is authorized to send and a group of recipients for a group of messages that is within the group of message types.

27. The method of claim 23 further comprising:
identifying, by the controller running on the computer system, a group of recipients that is authorized to receive the message from the application; and
sending, by the controller, an identification of the group of recipients identified, criteria for selecting the recipient from the group of recipients, and routing information used by the proxy to directly send the message to the recipient.

28. The method of claim 27 further comprising:
identifying, by the controller, encryption information used by the group of recipients; and
sending the encryption information and the access information to the proxy.

29. The method of claim 27 further comprising:
identifying, by the controller, an availability of recipients for messages sent by the application and sends updates to the proxy identifying a current group of recipients for the application.

30. The method of claim 23, wherein the access information is selected from at least one of an address, an internet protocol address, a universal resource locator, the recipient for the message, routing information, authorization information, an encryption key, or authentication information.

31. The method of claim 23 further comprising:
receiving, by the proxy, the access information from the controller while the proxy is running; and
receiving, by the proxy, updates to the access information while the proxy is running.

32. The method of claim 23, wherein the proxy is configured with an identification of the application that sends the message and only accepts the message from the application using the identification.

33. The method of claim 23, wherein the recipient is selected from one of a second proxy, a second application, and a provider service.

34. The method of claim 23, wherein the application is a consumer service and the message sent by the consumer service is directed to a provider service.

35. The method of claim 23, wherein the message is selected from one of a call, an application programming interface call, a request, and a reply.

36. A computer program product for securing communications in a computer system, the computer program product comprising:
a computer readable storage device;
first program code, stored on the computer readable storage device, for receiving, by a proxy in a container running on the computer system, a message from an application in the container, wherein all communications into and out of the container go through the proxy;
second program code, stored on the computer readable storage device, for identifying, by the proxy, a recipient for the message using access information received from a controller outside of the container, wherein the access information comprises a group of recipients in live applications identified by the controller, encryption schemes used by each of the recipients, and routing information to send messages to the group of recipients;
third program code, stored on the computer readable storage device, for encrypting, by the proxy, the message using the encryption schemes contained in the access information; and
fourth program code, stored on the computer readable storage device, for sending, by the proxy, the message to the recipient using the routing information contained in the access information.

37. The computer program product of claim 36 further comprising:
fifth program code, stored on the computer readable storage device, determining, by the proxy, whether the application is authorized to send the message, wherein performing identifying the recipient for the message using the access information; encrypting the message using the access information; and sending the message to the recipient when the application is authorized to send the message.

38. The computer program product of claim 36, wherein the container isolates the application and the proxy from other software components in a secure communications system.

39. The computer program product of claim 36, wherein the access information identifies a group of messages types that the application is authorized to send and a group of recipients for the messages that are within the group of message types.

* * * * *